United States Patent
Naziri et al.

(10) Patent No.: US 9,175,787 B2
(45) Date of Patent: Nov. 3, 2015

(54) LINER DISPLACEMENT CONTROL VALVE INCLUDING VALVE TRIM WITH SPINDLE AND FLOW CONTROL ELEMENT FOR IMPROVED LOW FLOW CONTROL

(71) Applicant: Control Components, Inc., Rancho Santa Margarita, CA (US)

(72) Inventors: Kevin Naziri, Mission Viejo, CA (US); Graham Clark, Silverado, CA (US)

(73) Assignee: Control Components, Inc., Rancho Santa Margarita, CA (US)

( * ) Notice: Subject to any disclaimer, the term of this patent is extended or adjusted under 35 U.S.C. 154(b) by 170 days.

(21) Appl. No.: 14/033,249

(22) Filed: Sep. 20, 2013

(65) Prior Publication Data
US 2015/0083244 A1   Mar. 26, 2015

(51) Int. Cl.
*F16K 47/08* (2006.01)
*B01D 35/04* (2006.01)
*F16K 31/50* (2006.01)

(52) U.S. Cl.
CPC ............... *F16K 47/08* (2013.01); *B01D 35/04* (2013.01); *F16K 31/508* (2013.01); *Y10T 137/8085* (2015.04); *Y10T 137/86718* (2015.04)

(58) Field of Classification Search
CPC ....... F16K 47/08; F16K 31/508; F16K 47/04; F16K 1/06; F16K 3/34; F16K 31/50; B01D 35/04; Y10T 137/86718; Y10T 137/8085; F16L 55/02
USPC .......................... 251/118, 120–122, 126–127; 138/41–43
See application file for complete search history.

(56) References Cited

U.S. PATENT DOCUMENTS

| | | | | |
|---|---|---|---|---|
| 1,406,747 | A * | 2/1922 | Massip | 137/177 |
| 1,645,601 | A * | 10/1927 | Lee | 251/122 |
| 1,919,232 | A * | 7/1933 | Lee | 251/122 |
| 2,619,122 | A * | 11/1952 | Hunter | 251/120 |
| 2,658,529 | A * | 11/1953 | Hensley | 138/46 |
| 2,903,011 | A * | 9/1959 | Long | 137/270 |
| 3,252,480 | A * | 5/1966 | Odendahl et al. | 137/625.3 |
| 3,908,698 | A * | 9/1975 | Baumann | 137/625.3 |
| 3,948,479 | A * | 4/1976 | Bedo et al. | 251/121 |
| 3,971,411 | A * | 7/1976 | Baumann | 137/625.3 |
| 4,044,991 | A * | 8/1977 | Waller | 251/122 |
| 4,549,718 | A * | 10/1985 | Seger | 251/121 |
| 4,617,963 | A * | 10/1986 | Stares | 137/625.3 |
| 4,634,095 | A * | 1/1987 | Taylor | 251/121 |

(Continued)

OTHER PUBLICATIONS

International Search Report and Written Opinion for PCT/US2014/056134 (11 pages). Issued on Dec. 31, 2014.

*Primary Examiner* — John Bastianelli
(74) *Attorney, Agent, or Firm* — Stetina Brunda Garred & Brucker

(57) ABSTRACT

A linear displacement control valve comprising a valve body having a valve bonnet cooperatively engage thereto. The body and the bonnet collectively accommodate a valve trim which comprises a flow control element and a complementary spindle. The spindle is preferably attached to a reciprocally movable valve stem of the control valve via a stem adaptor. The stem adaptor is adapted to allow for some measure of "float" between the spindle and the flow control element as may be needed to accommodate any misalignment therebetween. The spindle is uniquely configured such that when used in conjunction with the flow control element, the trim is capable of providing low end flow control at a higher level of accuracy and/or wider rangeability.

20 Claims, 4 Drawing Sheets

(56) References Cited

U.S. PATENT DOCUMENTS

| | | |
|---|---|---|
| 5,803,119 A | 9/1998 | Steinke |
| 7,832,653 B2 * | 11/2010 | Yukimoto .................. 236/92 B |
| 2003/0116204 A1 | 6/2003 | Volovets et al. |
| 2004/0050433 A1 | 3/2004 | Nawaz |
| 2005/0224737 A1 * | 10/2005 | Mihaylov et al. ............. 251/126 |
| 2006/0278285 A1 | 12/2006 | Shukhmin et al. |
| 2010/0300565 A1 | 12/2010 | Samy |

\* cited by examiner

LINER DISPLACEMENT CONTROL VALVE INCLUDING VALVE TRIM WITH SPINDLE AND FLOW CONTROL ELEMENT FOR IMPROVED LOW FLOW CONTROL

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

1. Technical Field of the Invention

The present invention relates generally to flow control devices and, more particularly, to a linear displacement control valve including a valve trim outfitted with a uniquely configured spindle which is adapted to provide low end flow control at a higher level of accuracy and/or wider rangeability.

2. Description of the Related Art

In the prior art, one currently know control valve includes a plug or spindle that is linearly displaced during normal operation of the valve. Within these valves, which are often referred to as linear displacement valves, the plug is disposed and moveable within a disc stack or valve cage which defines a multiplicity of tortuous and/or non-tortuous fluid passageways. The valve trim of these valves comprises the combination of the plug and the valve cage. Certain linear displacement valves are configured for "over plug flow" wherein fluid flows radially inward into the interior of the valve cage from the exterior thereof, with the fluid undergoing a pressure drop as a result of the flow through the passageways of the valve cage. In this arrangement, the valve is opened by lifting the plug off a seat ring which thus allows the fluid to flow from the interior of the valve cage and out of the valve via the unblocked seat ring. Conversely, movement of the seating surface of the plug into sealed engagement with the complimentary seating surface of the seat ring facilitates a closed or shut-off condition for the valve.

As an alternative to over plug flow, other linear displacement valves are configured for "under plug flow" wherein fluid flows axially upwardly into the interior of the valve cage to the exterior thereof, with the fluid undergoing a pressure drop as a result of the flow of the fluid radially outwardly through the fluid passageways of the valve cage. In this arrangement, the valve is opened by lifting the plug off of the aforementioned seat ring, which thus allows the fluid to flow into the interior of the valve cage and thereafter radially outwardly through the fluid passageways of the valve cage. Conversely, the movement of the seating surface of the plug into sealed engagement with the complimentary seating surface of the seat ring facilitates a closed or shut-off condition for the valve.

Linear displacement control valves are often used to control flow and pressure in a process. However, such control valves possess certain deficiencies which detract from their overall utility. More particularly, in those applications where controllable low flow is a requirement, the valve trim is typically incapable of controlling flow accurately due, in large measure, to shortcomings in the existing designs of the plug or spindle integrated therein. In addition, in certain applications, the pressure drop in the control valve is severe enough to cause high velocity flow between the spindle and the inner diameter of the valve cage or disc stack. The high velocity flow eventually erodes the tip of the spindle, thus creating further problems in relation to low flow control using the valve. Thus, there exists a need in the art for a linear displacement control valve which is capable of providing low end flow control at a higher level of accuracy and/or wider rangeability. The present invention addresses this particular need, with the various features and advantages thereof being described in more detail below.

BRIEF SUMMARY OF THE INVENTION

In accordance with the present invention, there is provided a linear displacement control valve comprising a valve body having a valve bonnet cooperatively engage thereto. The body and the bonnet collectively define a housing which accommodates a valve trim comprising a flow control element and a complementary valve plug or spindle. The spindle is preferably attached to a reciprocally movable valve stem of the control valve via a stem adaptor. The stem adaptor is adapted to allow for some measure of "float" between the spindle and the flow control element as may be needed to accommodate any misalignment therebetween. The flow control element is preferably circumvented by an internal strainer included in the control valve.

In the valve trim of the control valve, the plug or spindle is uniquely configured such that when used in conjunction with the flow control element, the trim is capable of providing low end flow control at a higher level of accuracy and/or wider rangeability. In an exemplary embodiment, the rangeability of the trim is 50 to 1. To facilitate this enhanced functionality, the spindle, and in particular the outer diameter thereof, is preferably lapped to the inner diameter of the flow control element, providing a very close fit or tolerance therebetween. This close tolerance between the spindle and the inner diameter of the flow control element substantially mitigates or eliminates any high velocity annular fluid flow which could otherwise occur between the spindle and the flow control element in certain applications, thus making the spindle less susceptible to erosion.

In addition, a substantial portion of the spindle is provided with at least one, and preferably a series of labyrinth grooves formed therein in a prescribed shape, to a prescribed width and depth, and in a prescribed spatial relationship relative to each other. More particularly, a preferred depth of each of the labyrinth grooves is about 0.02 inches, with a preferred width being about 0.02 inches. Further, each of the labyrinth grooves preferably has a generally square profile with sharp edges.

In the control valve, the labyrinth grooves formed in the spindle of the valve trim serve two functions. During operation of the control valve, when a pressure drop from a first pressure level to a second pressure level creates a high velocity in the annular area between the outer diameter of the spindle and the inner diameter of the stack, the labyrinth grooves function as a "labyrinth" to slow down such flow and thus minimize erosion of the spindle. In addition, in those instances where the fluid is contaminated due to, for example, any damage to the internal strainer, the small particles that eventually work their way between the spindle and the flow control element (despite the lapped fit) will get trapped in the labyrinth grooves, thus preventing the sticking or jamming of the spindle to the flow control element. As such, during the movement of the spindle relative to the flow control element to facilitate the opening and closing of the control valve, the labyrinth grooves provide pressure balance and further reduce the velocity of any residual flow between the spindle and the flow control element thereby enhancing the erosion mitigating effects of the close tolerance therebetween. In this regard, the labyrinth grooves, in cooperation with the close tolerance between the spindle and the inner diameter of the flow control element, provide the valve trim with, among other things, the functionality of reducing fluid flow velocity to a level where erosion of the spindle will not take place during the operation of the control valve.

The present invention is best understood by reference to the following detailed description when read in conjunction with the accompanying drawings.

BRIEF DESCRIPTION OF THE DRAWINGS

These, as well as other features of the present invention, will become more apparent upon reference to the drawings wherein.

Common reference numerals are used throughout the drawings and detailed description to indicate like elements.

DETAILED DESCRIPTION OF THE INVENTION

Figure 1:
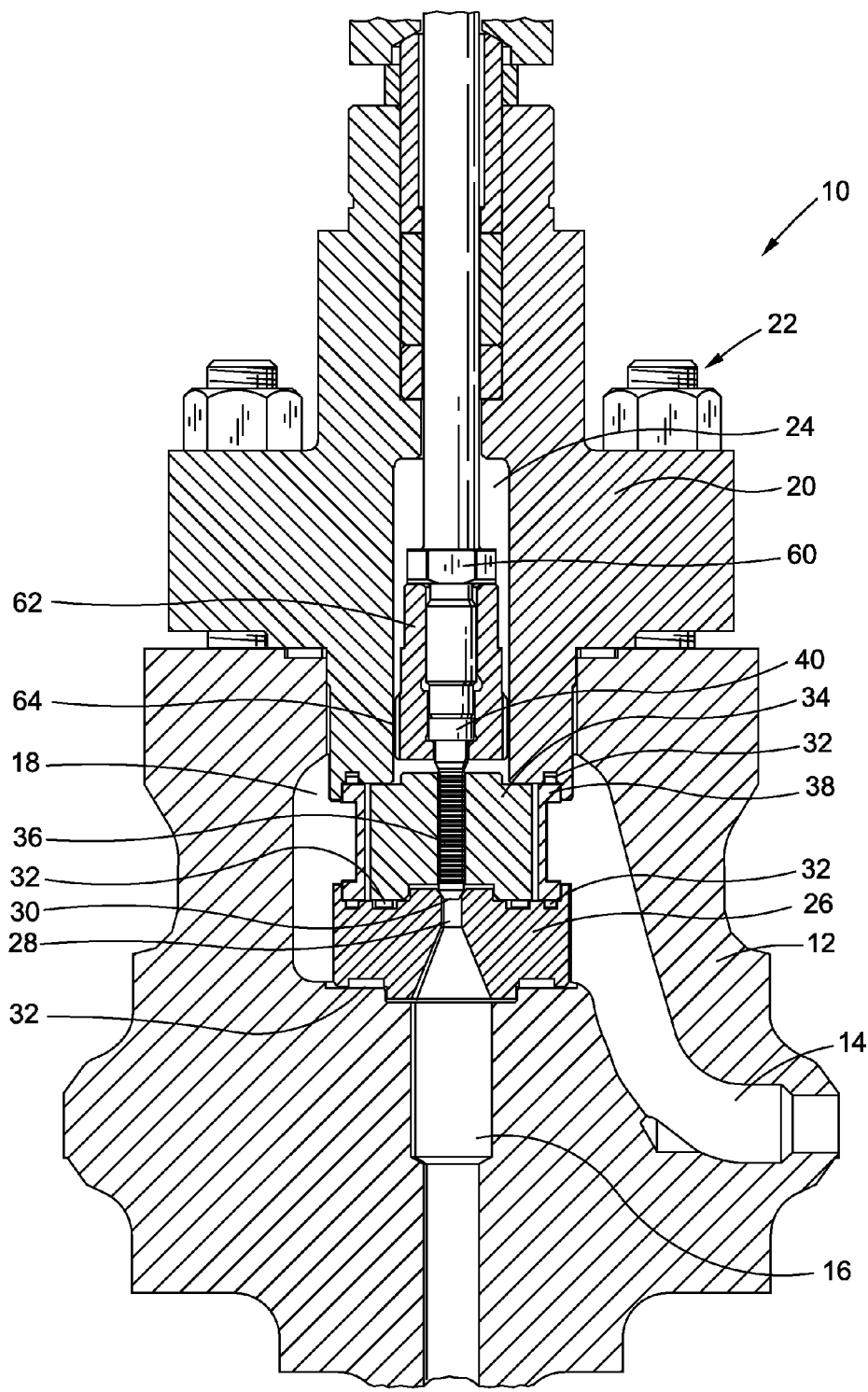
FIG. 1 is a cross-sectional view of a linear displacement control valve constructed in accordance with the present invention, illustrating the plug thereof in a closed position.
Figure 2:
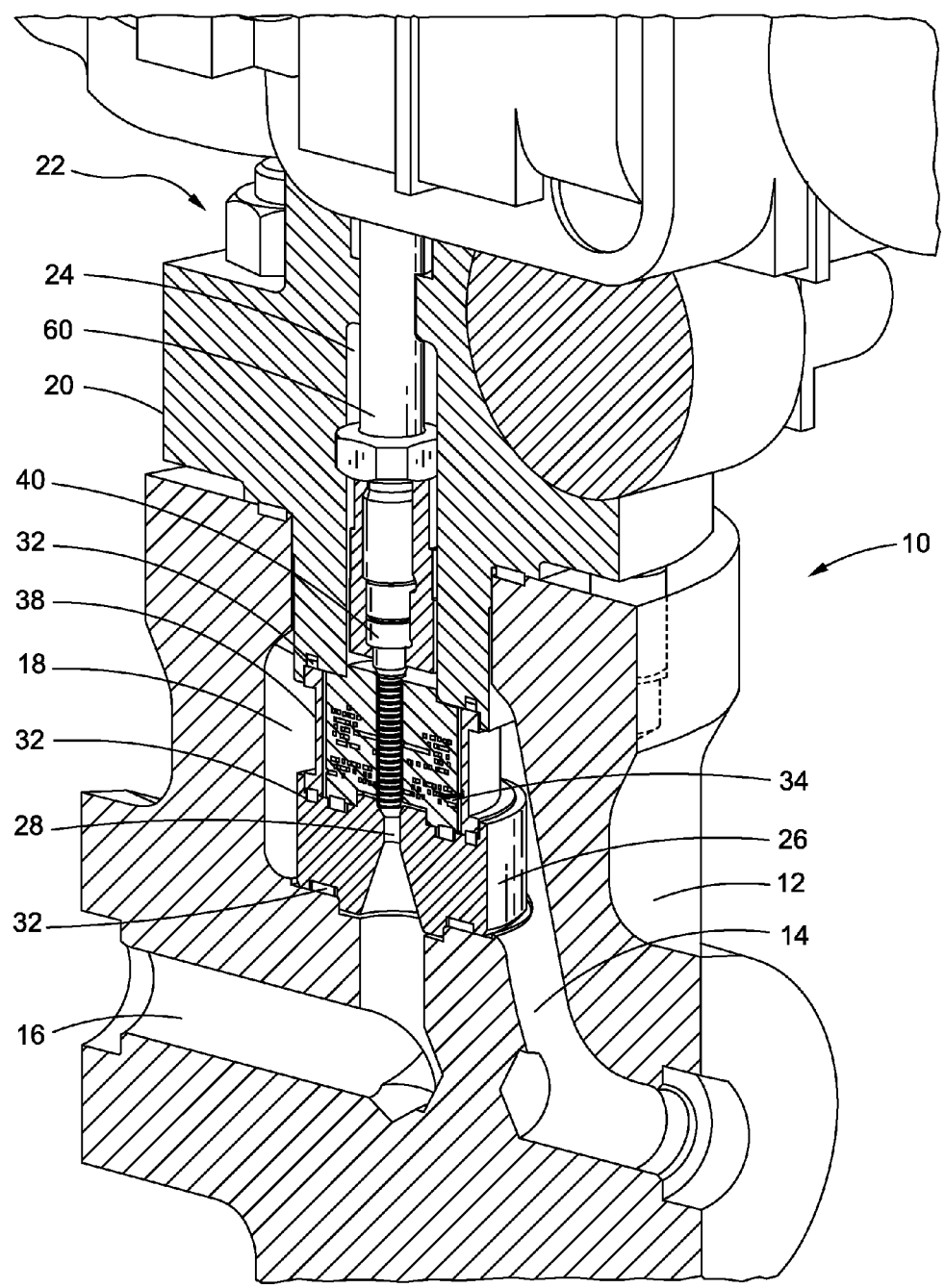
FIG. 2 is a perspective, cross-sectional view of the linear displacement control valve shown in FIG. 1, illustrating the plug thereof in a closed position.

Referring now to the drawings wherein the showings are for purposes of illustrating a preferred embodiment of the present invention only, and not for purposes of limiting the same, FIG. 1 is a cross-sectional views of a linear displacement control valve 10 constructed in accordance with the present invention. As will be described in more detail below, the valve 10 is shown in FIGS. 1 and 2 in a closed or shut-off position.

The valve 10 comprises a valve body 12 which defines an inflow passage 14 and an outflow passage 16. The inflow and outflow passages 14, 16 each fluidly communicate with an interior chamber or valve gallery 18 defined by the body 12. In addition to the body 12, the valve 10 includes a bonnet 20 which is attached to the body 12 and partially encloses the gallery 18. The body 12 and the bonnet 20 collectively define a housing of the control valve 10. As seen in FIG. 1, the attachment of the bonnet 20 to the body 12 is preferably facilitated through the use of mechanical fasteners 22 comprising a nut and bolt combination, though other attachment methods are contemplated to be within the spirit and scope of the present invention. The bonnet 20 defines a bore 24 which extends axially therethrough, the use of which will be described in more detail below. That interior surface of the bonnet 20 which defines the bore 24 is preferably nitrided for surface hardening.

Disposed within the gallery 18 of the body 12 is an annular seat ring 26. The seat ring 26 defines a circularly configured outflow opening 28, the top end of which (when viewed from the perspective shown in FIG. 1) is circumvented by a tapered seating surface 30. The seat ring 26 is oriented within the body 12, and in particular the gallery 18 thereof, such that the outflow opening 28 is coaxially aligned with the outflow passage 16. In addition to the outflow opening 28, the seat ring 26 defines pair of annular, concentrically positioned top grooves, and an annular bottom groove which are disposed in respective ones of the opposed top and bottom surfaces thereof, as also viewed from the perspective shown in FIG. 1. Disposed within each of the top and bottom grooves is a sealing member such as an O-ring 32 or gasket. The O-ring 32 disposed within the bottom groove is captured between the seat ring 26 and the valve body 12, thereby preventing fluid flow from the gallery 18 into the outflow passage 16 between the body 12 and the seat ring 26.

In addition to the seat ring 26, disposed within the gallery 18 is a flow control element 34. The flow control element 34 has an annular, generally cylindrical configuration, and defines a central bore 36 which extends axially therethrough and has a generally circular cross-sectional configuration. The flow control element 34 also includes a multiplicity of tortuous and/or non-tortuous fluid energy dissipating flow passageways extending radially therethrough (i.e., between the inner and outer circumferential surfaces thereof). One end of each of these flow passageways fluidly communicates with the bore 36, with the opposite end fluidly communicating with the gallery 18. When viewed from the perspective shown in FIG. 1, the bottom surface of the flow control element 34 is cooperatively engaged to the top surface of the seat ring 26 such that the O-ring 32 disposed within the inner one of the concentrically positioned grooves formed in the top surface of the seat ring 26 is effectively captured and forms a fluid-tight seal between the seat ring 26 and the flow control element 34. In addition, the flow control element 34 is positioned within the gallery 18 and relative to the seat ring 26 such that the bore 36 thereof is coaxially aligned with the outflow opening 28 of the seat ring 26, and hence the outflow passage 16 of the valve body 12. The flow control element 34 of the control valve 10 of the present invention is preferably fabricated through the use of a direct metal laser sintering (DMLS) process as is described with particularity in Applicant's co-pending U.S. application Ser. No. 12/018,088 entitled DIRECT METAL LASER SINTERED FLOW CONTROL ELEMENT filed Jan. 22, 2008, the entirety of which is incorporated herein by reference. The use of the DMLS process to facilitate the fabrication of the flow control element 34 allows for the creation of more intricate and complex flow passages therein. Such increased intricacy/complexity provides better flow range/rangeability within the control valve 10. However, those of ordinary skill in the art will recognize that the flow control element 34 may alternatively comprise a more conventional disc stack or valve cage as opposed to be fabricated through the use of the aforementioned DMLS process.

Also disposed within the gallery 18 is an internal strainer 38. The strainer 38 has a tubular, cross-sectional configuration, with the inner diameter of the strainer 38 being size to slightly exceed the outer diameter of the flow control element 34. In this regard, as seen in FIGS. 1 and 2, the flow control element 34 is preferably concentrically nested within the interior of the strainer 38 such that the strainer 38 circumvents and thus shields the outer diameter or surface of the flow control element 32, and hence those ends of the fluid energy dissipating flow passageways extending thereto. When viewed from the perspective shown in FIG. 1, the bottom surface of the strainer 38 is cooperatively engaged to the top surface of the seat ring 26 such that the O-ring 32 disposed within the outer one of the concentrically positioned grooves formed in the top surface of the seat ring 26 is effectively captured and forms a fluid-tight seal between the seat ring 26 and the strainer 38. In a similar fashion, the top surface of the strainer 38 is cooperatively engaged to the bottom surface of the bonnet 20 such that an O-ring 32 disposed within a complementary, circularly configured groove formed in the bottom surface of the bonnet 20 is effectively captured and forms a fluid-tight seal between the strainer 38 and the bonnet 20. In an exemplary embodiment, the strainer 38 may comprise a tube having a plurality of holes disposed therein and extending between the inner and outer surfaces thereof. The outer diameter or surface of the tube is preferably covered by one or more mesh layers, with the tube with the mesh layer(s) being welded to each other.

Figure 3:
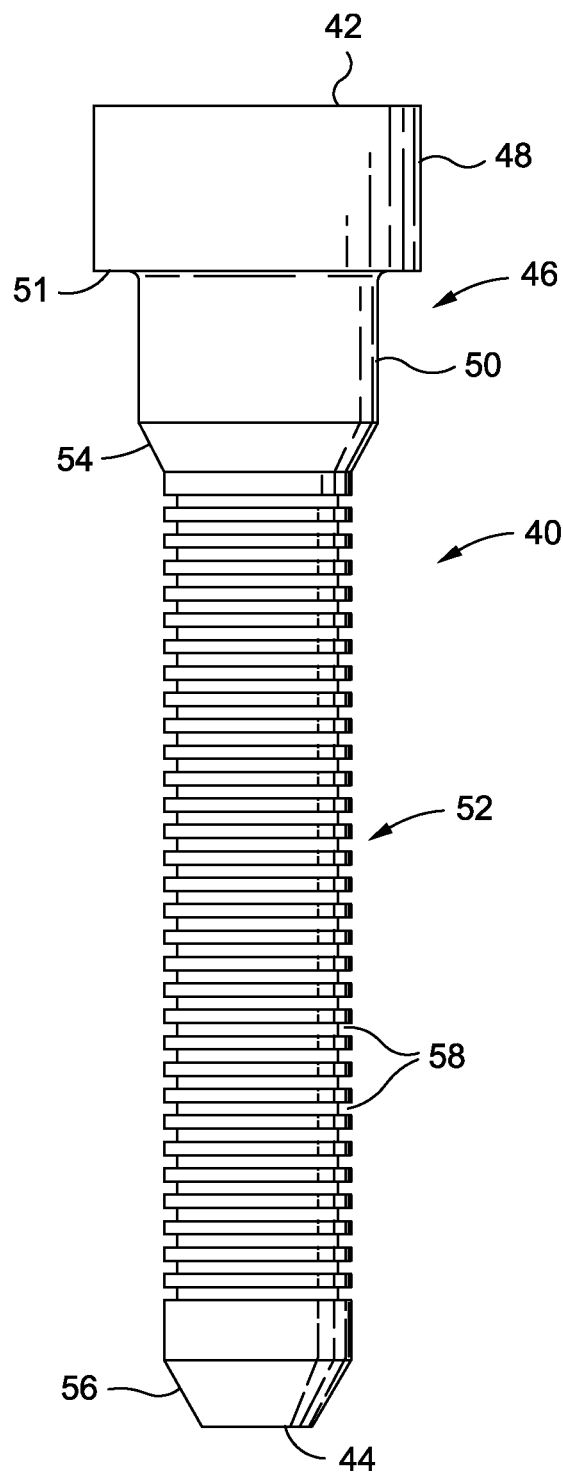
FIG. 3 is a side elevational view of the valve plug or spindle integrated into the valve trim of the control valve shown in FIGS. 1 and 2.

The control valve 10 constructed in accordance with the present invention further comprises an elongate, generally cylindrical plug or spindle 40, which is shown with particularity in FIG. 3. When viewed from the perspective shown in FIGS. 1-3, the spindle 40 defines a proximal or top end 42 and an opposed distal or bottom end 44. The top end 42 is defined by a cylindrically configured shank portion 46. The shank portion 46 is not of uniform outer diameter. Rather, the shank portion 46 includes an upper, first section 48 which is of a first outer diameter, and an integral lower, second section 50, the outer diameter of which is less than that of the first section 48. As a result, the first and second sections 48, 50 of the shank portion 46 are separated from each other by a continuous, annular shoulder 51.

In addition to the shank portion 46, the spindle 40 defines an elongate, generally cylindrical needle portion 52. The outer diameter of the needle portion 52 is selected so as to achieve a prescribed spatial relationship to the inner diameter of the flow control element 36 for reasons which will be described in more detail below. An upper, first beveled portion 54 also defined by the spindle 40 facilitates the transition between the second section 50 of the shank portion 46 and the needle portion 52. Similarly, a lower, second beveled portion 56 of the spindle 40 facilitates the transition from the needle portion 52 to the bottom end 44.

Formed in the needle portion 52 of the spindle 40 is at least one, and preferably a series of continuous labyrinth grooves 58. Each of the labyrinth grooves 58 preferably has a generally square profile with sharp edges. More particularly, each of the labyrinth grooves 58 is preferably formed to be of a depth of about 0.02 inches, and a width of about 0.02 inches. The labyrinth grooves 58 are arranged in the needle portion 52 in substantially equidistantly spaced relation to each other, with the uppermost one of the labyrinth grooves 58 being disposed proximate the first beveled portion 54, and the lowermost one of the labyrinth grooves 58 being disposed proximate the second beveled portion 56. The functionality of the labyrinth grooves 58 will also be discussed in more detail below.

The spindle 40, and in particular the shank portion 46 thereof, is operatively coupled to one end (i.e., the lower end when viewed from the perspective shown in FIG. 1) of an elongate stem 60 of the control valve 10. The stem 60 is advanced through the bore 24 defined by the bonnet 20. Though not shown with particularity in FIGS. 1 and 2, is contemplated that a portion of the stem 60 protruding from the bonnet 20 may be mechanically coupled to an actuator which is operative to selectively move the stem 60 in either an upward or downward direction relative to the body 12 and bonnet 20 when viewed from the perspective shown in FIGS. 1 and 2. In this regard, the bore 24 and stem 60 are size relative to each other such that the stem 60 is slidably movable within the bore 24 in a reciprocal fashion. As will be recognized by those of ordinary skill in the art, the selective movement of the stem 60 in an upward or downward direction in turn facilitates the concurrent movement of the spindle 40 in an upward or downward direction relative to the body 12 and bonnet 20, and hence the flow control element 34. In this respect, as will be described in more detail below, the spindle 40 is selectively moveable by the stem 60 between the closed or shut-off position shown in FIGS. 1 and 2, and an open position.

The operative coupling of the stem 60 the spindle 40 in the control valve 10 is preferably facilitated by a stem adaptor 62. The stem adaptor 62 has a generally cylindrical, tubular configuration, and is specifically configured to engage both the shank portion 46 of the spindle 40 and the lower portion of the stem 60 in a manner cooperatively engaging the spindle 40 and separate stem 60 to each other. More particularly, it is contemplated that the lower portion of the stem 60 will be externally threaded and threadably engaged to a corresponding, internally threaded upper portion of the stem adaptor 62. The shank portion 46 of the spindle 40 resides within the interior of the stem adaptor 62, with the shoulder 51 being engaged thereby such that the spindle 40 is supported by the stem adaptor 62, but is capable of some prescribed amount of movement relative thereto. Thus, the structural attributes of the stem adaptor 62 are adapted to allow for some measure of "float" between the spindle 40 and the flow control element 34 as may be needed to accommodate any misalignment therebetween for reasons which will be discussed in more detail below. As further seen in FIGS. 1 and 2, and as viewed from the perspective shown therein, the outer surface of approximately the lower third of the stem adaptor 62 preferably includes a series of elongate channels 64 formed therein and extending circumferentially thereabout, the channels 64 being provided in a prescribed spatial relationship to each other and each extending in spaced, generally parallel relation to the axis of the stem adaptor 62. The channels 64 are adapted to allow any fluid within the bore 24 of the bonnet 22 easily pass to the gallery 18 when the control valve 10, and in particular the spindle 40 thereof, is actuating between its open and closed positions for reasons which will also be discussed in more detail below.

In the control valve 10, the stem adaptor 62 resides exclusively within the bore 24 of the bonnet 20 during movement of the spindle 40 between its closed position shown in FIGS. 1 and 2 and its fully open position. Over the entire range of movement of the spindle 40, at least a portion of the needle portion 52 thereof remains within the bore 36 of the flow control element 34. More particularly, when the spindle 40 is in its closed position, virtually the entire length of the needle portion 52 resides within the bore 36 of the flow control element 34. When the spindle 40 is actuated from its closed position to an open position, at least a portion of the needle portion 52 will be withdrawn from within the bore 36 and retracted into the bore 24 of the bonnet 20.

As indicated above, the valve 10, and in particular the spindle 40 thereof, is shown in its closed or shut-off position in FIGS. 1 and 2. When the spindle 40 is in the closed position, a seating surface defined by the second beveled portion 56 thereof is firmly seated and sealed against the complimentary seating surface 30 defined by the seat ring 26. As a result, fluid flowing through the inflow passage 14 of the body 12, through the strainer 38, through the flow passageways of the flow control element 34, and into the bore 36 of the strainer 34 is effectively blocked from flowing into the outflow opening 28 (and hence the outflow passage 16 of the body 12) by the spindle 40. The movement of the spindle 40 to its open position is facilitated by the upward movement of the stem 60 in any amount which is sufficient to cause the second beveled portion 56 of the spindle 40 to be elevated above the complimentary seating surface 30 defined by the seat ring 26 when viewed from the perspective shown in FIGS. 1 and 2. As will be recognized, such upward movement of the stem 60 facilitates the separation of the second beveled portion 56 of the spindle 40 from the seating surface 30, thus allowing fluid to enter the outflow opening 28 from the bore 36.

Thus, when the spindle 40 is moved to its open position, fluid is able to flow from the inflow passage 14 into the gallery 18. From the gallery 18, the fluid passes radially inwardly through the strainer 38, which is operative to filter any contaminates such as small particles therefrom. After passing through the strainer 38, the fluid enters and flows radially inwardly through the tortuous and/or non-tortuous energy dissipating flow passageways of the flow control element 34 and into the bore 36 defined thereby. After exiting the flow passageways of the flow control element 34 at the inner circumferential surface thereof defining the bore 36, the fluid is able to flow into the outflow passage 16 defined by the body 12 via the uncovered outflow opening 28 of the seat ring 26. As is apparent from the foregoing, this mode of operation is indicative of "over plug flow" as described above. As is a common characteristic of linear displacement valves, the degree of opening of the control valve 10 is variable, and based on the level of separation of the second beveled portion 56 of the spindle 40 from the seating surface 30. In this regard, the level of fluid flow through the flow control element 34, as well as the energy dissipating functionality thereof, is regulated by the number of flow passageways uncovered by the progressive movement of the second beveled portion 56 of the spindle 40 away from the seating surface 30.

As indicated above, the channels 64 within the stem adaptor 62 allow fluid to freely migrate between the gallery 18 and the bore 24 of the bonnet 20 as the spindle 40/stem 60 are actuated or cycled between the open and closed positions. Such flow through the channels 64 of the stem adaptor 62 effectively creates a "balanced" condition within the valve 10. More particularly, the channels 64 are operative to prevent hydraulic lock as the control valve 10 is being actuated between its open and closed positions. In this regard, during operation of the control valve 10, fluid will normally fill into the bore 24. In the absence of the channels 64, such fluid could cause the occurrence of a hydraulic lock. As indicate above, the channels 64 prevent such lock by allowing the fluid in the bore 24 to pass therefrom, thus relieving any pressure build-up in the bore 24.

As also indicate above, based on the aforementioned description of fluid flow through the valve 10, such valve 10 is configured for over plug flow. However, those of ordinary skill in the art will recognize that valve 10 may also be configured for under plug flow without departing from the spirit and scope of the present invention. In an under plug flow condition, it is contemplated that the strainer 38 may be eliminated, with the outflow passage 16 becoming the inflow passage, and the inflow passage 14 becoming the outflow passage. In this regard, when the spindle 40 is moved to its open position, fluid is able to flow from the inflow passage into the bore 36 of the flow control element 34 via the opening 28 of the seat ring 26. The fluid then passes radially outwardly through the tortuous and/or non-tortuous energy dissipating flow passageways of the flow control element 34, into the gallery 18, and thereafter into the outflow passage.

In the control valve 10, the spindle 40, and in particular the outer diameter of the needle portion 52 thereof, is preferably matched or lapped to the inner diameter of the flow control element 34 (i.e., the diameter of the bore 36) to provide a very close fit or tolerance therebetween. This close tolerance between the needle portion 52 of the spindle 40 and the inner diameter of the flow control element 34 substantially mitigates or eliminates any high velocity annular fluid flow which could otherwise occur between the needle portion 52 and the flow control element 34 in certain applications when the spindle 40 is actuated from its closed position to its open position. As previously explained, the mitigation or elimination of any high velocity annular fluid flow between any portion of the needle portion 52 residing within the bore 36 and the flow control element 34 makes the spindle 40 less susceptible to erosion.

In addition, the labyrinth grooves 58 formed in the needle portion 52 of the spindle 40 serve two functions. During the operation of the control valve 10, when a pressure drop from a first pressure level to a second pressure level creates a high velocity in the annular area between the outer diameter of the needle portion 52 and the inner diameter of the flow control element 34, the labyrinth grooves 58 function to slow down such residual flow, thus working in concert with the close tolerance fit between the needle portion 52 and the flow control element 34 to minimize erosion of the spindle 40. In addition, in those instances where the fluid is contaminated due to, for example, any damage to the strainer 38, any small particles that eventually work their way between the needle portion 52 of the spindle 40 and the inner diameter of the flow control element 34 (despite the close tolerance fit their between) will typically get trapped in the labyrinth grooves 58, thus preventing the sticking or jamming of the spindle 40 to the flow control element 34 as could otherwise compromise the proper opening and closing of the control valve 10. Thus, the labyrinth grooves 58, in cooperation with the close tolerance between this needle portion 52 of the spindle 40 and the inner diameter of the flow control element 34, provide the functionality of reducing fluid flow velocity to a level where erosion of the spindle 40 will not take place during the operation of the control valve 10. Even with the close tolerance between the needle portion 52 and the flow control element 34, the aforementioned "float" imparted by the attachment of the spindle 40 to the stem 60 through the use of the stem adaptor 62 prevents any misalignment between the needle portion 52 and the flow control element 34 as could otherwise result in the needle portion 52 becoming jammed within the bore 36. Thus, though supporting the spindle 40, the stem adaptor 62 allows the spindle 40 to move around for alignment purposes. Moreover, in the valve trim of the control valve 10 (the valve trim comprising the combination of the flow control element 34 and spindle 40), the aforementioned structural features of the spindle 40 and matching thereof to the flow control element 34 impart to the trim the capability of providing low end flow control at a higher level of accuracy and/or wider rangeability. In an exemplary embodiment, the rangeability of the trim is 50 to 1.

Figure 4:
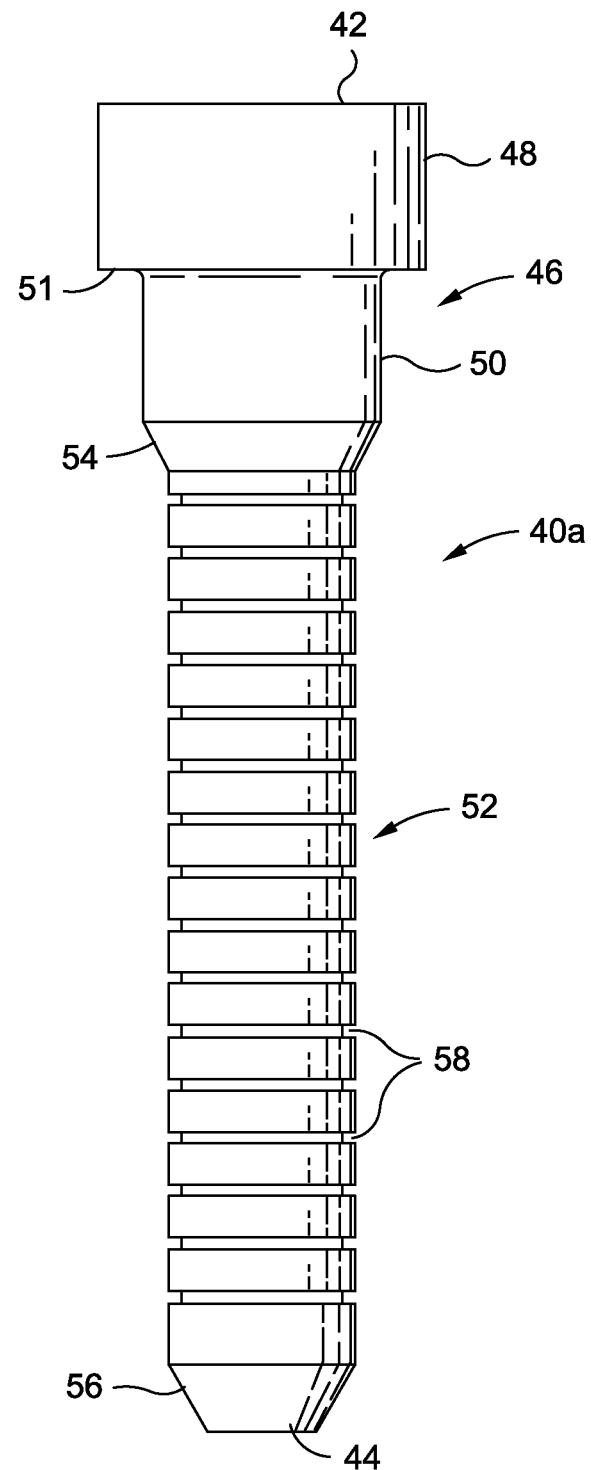
FIG. 4 is a side elevational view of a potential variant of the spindle shown in FIG. 3 which may optionally be integrated into the valve trim of the control valve shown in FIGS. 1 and 2.

Those of ordinary skill in the art will recognize that the size, shape and/or spacing of the labyrinth grooves 58 formed in the needle portion 52 of the spindle 40 may be varied based on a prescribed application, with the embodiment shown with particularity in FIG. 3 serving as only one exemplary configuration. In this regard, FIG. 4 depicts a spindle 40a which may be integrated into the control valve 10 in substitution for the spindle 40. The distinction between the spindles 40, 40a lies in the labyrinth grooves 58 within the spindle 40a being spaced further from each other, and provided in a reduced number, in comparison to the spacing/number of labyrinth grooves 58 included in the spindle 40.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A control valve for regulating the flow of a fluid, the valve comprising:
a housing defining a fluid inlet and a fluid outlet;
a flow control element disposed within the housing between the fluid inlet and the fluid outlet, the flow control element being configured to dissipate energy in a fluid flowing therethrough from the fluid inlet to the fluid outlet; and
a spindle disposed within the housing and reciprocally moveable between closed and open positions relative thereto, the spindle including a multiplicity of labyrinth grooves formed therein in series, labyrinth grooves being sized and configured to mitigate any high velocity annular fluid flow between the flow control element and the spindle when the spindle is moved to the open position; and
a stem which is operatively coupled to the spindle by a stem adaptor adapted to allow for a prescribed amount of movement of the spindle relative to the stem and the flow control element during the movement of the spindle between the open and closed positions.

2. The control valve of claim 1 wherein:
the spindle comprises a shank portion having a generally cylindrical needle portion which protrudes therefrom and is of a prescribed outer diameter, the needle portion including the labyrinth grooves formed therein;
the flow control element includes a bore defined by an inner surface thereof which is of a prescribed inner diameter, the bore accommodating at least part of the needle portion when the spindle is in either of the open and closed positions; and
the outer diameter of the needle portion and the inner diameter of the flow control element are sized relative to each other such that a prescribed dimensional tolerance therebetween, in combination with the labyrinth grooves, substantially mitigates any high velocity annular fluid flow between flow control element and the spindle when the spindle is moved to the open position.

3. The control valve of claim 1 wherein each of the labyrinth grooves has a generally square profile with sharp edges, and is formed to be of a depth of about 0.02 inches and a width of about 0.02 inches.

4. The control valve of claim 1 wherein:
the stem is threadably connected to the stem adaptor; and
the spindle is movably attached to the stem adaptor in a manner which compensates for a prescribed level of misalignment between the spindle and the flow control element when the spindle is moved between the open and closed positions.

5. The control valve of claim 4 wherein:
the housing comprises a body which defines a gallery, and a bonnet which is attached to the body and defines a bonnet bore communicating with the gallery thereof;
the flow control element is disposed within the gallery and the stem adaptor at least partially resides within the bore throughout the range of movement of the spindle between the open and closed positions; and
the stem adaptor includes at least one channel formed therein which facilitates fluid communication between the gallery and the bonnet bore.

6. The control valve of claim 1 further comprising an internal strainer which is disposed within the housing between the fluid inlet and the flow control element, the strainer at least partially circumventing the flow control element.

7. The control valve of claim 1 wherein the flow control element is a unitary structure defining a multiplicity of tortuous and non-tortuous energy dissipating flow passageways.

8. The control valve of claim 1 further comprising a seat ring defining a flow opening which extends therethrough and a sealing surface which circumvents the flow opening, a portion of the spindle and the sealing surface having complimentary configurations and being maintained in sealed engagement to each other when the spindle is in the closed position.

9. A control valve for regulating the flow of a fluid, the valve comprising:
a housing defining a fluid inlet and a fluid outlet;
a flow control element disposed within the housing between the fluid inlet and the fluid outlet, the flow control element including a bore defined by an inner surface thereof which is of a prescribed inner diameter, the flow control element being configured to dissipate energy in a fluid flowing therethrough from the fluid inlet to the fluid outlet;
a spindle disposed within the housing and reciprocally moveable between closed and open positions relative thereto, the spindle including a shank portion having a generally cylindrical needle portion which protrudes therefrom and is of a prescribed outer diameter, the needle portion including at least one labyrinth groove formed therein, the bore of the flow control element accommodating at least part of the needle portion when the spindle is in either of the open and closed positions, the outer diameter of the needle portion and the inner diameter of the flow control element being sized relative to each other such that a prescribed dimensional tolerance therebetween, in combination with the at least one labyrinth groove, substantially mitigates any high velocity annular fluid flow between the flow control element and the spindle when the spindle is moved to the open position; and
a stem which is operatively coupled to the spindle by a stem adaptor adapted to allow for a prescribed amount of movement of the spindle relative to the stem and the flow control element during the movement of the spindle between the open and closed positions.

10. The control valve of claim 9 wherein the needle portion of the spindle includes a multiplicity of labyrinth grooves formed therein in series.

11. The control valve of claim 10 wherein each of the labyrinth grooves has a generally square profile with sharp edges, and is formed to be of a depth of about 0.02 inches and a width of about 0.02 inches.

12. The control valve of claim 9 wherein:
the stem is threadably connected to the stem adaptor; and
the shank portion of the spindle is movably attached to the stem adaptor in a manner which compensates for a prescribed level of misalignment between the needle portion and the flow control element when the spindle is moved between the open and closed positions.

13. The control valve of claim 9 wherein:
the housing comprises a body which defines a gallery, and a bonnet which is attached to the body and defines a bonnet bore communicating with the gallery thereof;
the flow control element is disposed within the gallery and the stem adaptor at least partially resides within the bore throughout the range of movement of the spindle between the open and closed positions; and the stem adaptor includes at least one channel formed therein which facilitates fluid communication between the gallery and the bonnet bore.

14. The control valve of claim 9 further comprising an internal strainer which is disposed within the housing between the fluid inlet and the flow control element, the strainer at least partially circumventing the flow control element.

15. The control valve of claim 9 wherein the flow control element is a unitary structure defining a multiplicity of tortuous and non-tortuous energy dissipating flow passageways.

16. The control valve of claim 9 further comprising a seat ring defining a flow opening which extends therethrough and a sealing surface which circumvents the flow opening, a portion of the spindle and the sealing surface having complimentary configurations and being maintained in sealed engagement to each other when the spindle is in the closed position.

17. A control valve for regulating the flow of a fluid, the valve comprising:
   a housing defining a fluid inlet and a fluid outlet;
   a flow control element disposed within the housing between the fluid inlet and the fluid outlet, the flow control element being configured to dissipate energy in a fluid flowing therethrough from the fluid inlet to the fluid outlet; and
   a spindle disposed within the housing and reciprocally moveable between closed and open positions relative thereto, the spindle including a multiplicity of labyrinth grooves formed therein in series, the labyrinth grooves being sized and configured to mitigate any high velocity annular fluid flow between the flow control element and the spindle when the spindle is moved to the open position;

wherein each of the labyrinth grooves has a generally square profile with sharp edges, and is formed to be of a depth of about 0.02 inches and a width of about 0.02 inches.

18. The control valve of claim 17 wherein:
   the spindle comprises a shank portion having a generally cylindrical needle portion which protrudes therefrom and is of a prescribed outer diameter, the needle portion including the labyrinth grooves formed therein;
   the flow control element includes a bore defined by an inner surface thereof which is of a prescribed inner diameter, the bore accommodating at least part of the needle portion when the spindle is in either of the open and closed positions; and
   the outer diameter of the needle portion and the inner diameter of the flow control element are sized relative to each other such that a prescribed dimensional tolerance therebetween, in combination with the labyrinth grooves, substantially mitigates any high velocity annular fluid flow between flow control element and the spindle when the spindle is moved to the open position.

19. The control valve of claim 17 further comprising an internal strainer which is disposed within the housing between the fluid inlet and the flow control element, the strainer at least partially circumventing the flow control element.

20. The control valve of claim 17 wherein the flow control element is a unitary structure defining a multiplicity of tortuous and non-tortuous energy dissipating flow passageways.

\* \* \* \* \*

UNITED STATES PATENT AND TRADEMARK OFFICE
CERTIFICATE OF CORRECTION

PATENT NO. : 9,175,787 B2  
APPLICATION NO. : 14/033249  
DATED : November 3, 2015  
INVENTOR(S) : Kevin Naziri and Graham Clark It is certified that error appears in the above-identified patent and that said Letters Patent is hereby corrected as shown below:

On the Title page, item (54) and in the Specification, column 1, line 1,

--LINER DISPLACEMENT CONTROL VALVE INCLUDING VALVE TRIM WITH SPINDLE AND FLOW CONTROL ELEMENT FOR IMPROVED LOW FLOW CONTROL--

The title needs to be corrected to read:

--LINEAR DISPLACEMENT CONTROL VALVE INCLUDING VALVE TRIM WITH SPINDLE AND FLOW CONTROL ELEMENT FOR IMPROVED LOW FLOW CONTROL--

Signed and Sealed this  
First Day of March, 2016

Michelle K. Lee  
*Director of the United States Patent and Trademark Office*